Oct. 9, 1962

V. E. LUZENA 3,057,749

COLORED METALLIC FINISH

Filed Feb. 9, 1959

INVENTOR

VERL E. LUZENA

BY

ATTORNEY

3,057,749
COLORED METALLIC FINISH
Verl E. Luzena, Newburgh, N.Y., assignor to E. I. du Pont de Nemours and Company, Wilmington, Del., a corporation of Delaware
Filed Feb. 9, 1959, Ser. No. 792,173
4 Claims. (Cl. 117—76)

This invention relates to plastic sheet material having a colored metallic surface finish.

This application is a continuation-in-part of my copending application Serial No. 568,376, filed February 28, 1956, now abandoned.

It has been known to blend aluminum pigments with colored pigments to achieve colored metallic finishes on plastic sheet material. Such finishes have lacked brilliance, color depth, and metallic sheen. Attempts have been made to achieve these desirable properties by the use of various colored metal pigments such as bronze, copper, and even gold and silver. The use of colored metals in finishes for plastic sheet material has not been successful primarily due to discoloration of the metal in the finish.

The conventional colored pigments blended with aluminum pigment have resulted in finishes lacking in brilliance and color depth.

Attempts have also been made to produce brilliant colored metallic finishes by using soluble dyes with metallic pigments. Finishes made with the soluble dyes and aluminum pigment have not been light stable and the soluble dye will bleed or migrate when brought in contact with materials having an affinity for the dye.

An object of this invention is the provision of a plastic sheet material having a metallic finish more brilliant and resistant to discoloration than that obtained by the prior art. A more specific object is the provision of a colored metallic finish having metallic sheen, translucency, depth of color, and resistance to bleeding.

The objects of this invention are accomplished by applying a surface finish to a plastic sheet material which is different in shade than the base material, the surface finish comprising an organic film forming material, brilliant aluminum pigment and an alumina hydrate lake defined hereinafter.

Figure 1:
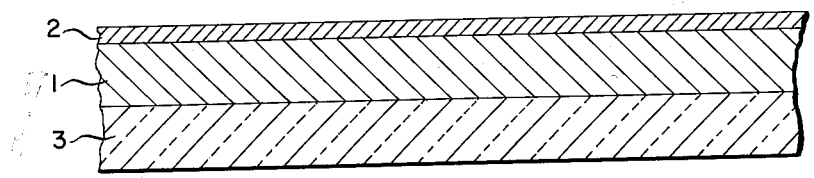
Figure 2:
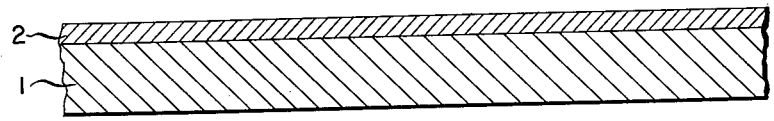

The presence of one or more of the following colored pigments in the surface layer is critical in carrrying out this invention:

Alumina hydrate lake of flavanthrone
Alumina hydrate lake of dibromoanthanthrone
Alumina hydrate lake of polychloro-anthraquinone 2,1(N)-benzacridone
Alumina hydrate lake of tri- to tetra-bromopyranthrone
Alumina hydrate lake of a perylene
Alumina hydrate lake of dibromopyranthrone
Alumina hydrate lake of anthrimide
Alumina hydrate lake of dimethoxy dibenzene anthanthrone In the drawing FIGURE 1 is a greatly enlarged cross sectional illustration of the product of this invention, where 3 represents the base fabric, 1 the base coating and 2 the coated metallic surface layer. FIGURE 2 is a greatly enlarged cross sectional illustration of a modification of the invention involving an unsupported film where 1 is the base layer and 2 is the colored metallic finish layer.

The following specific examples are given by the way of illustration and not limitation. Unless stated otherwise, the parts and percentage figures throughout the specification and claims are expressed on a weight basis.

Example I

A brilliant pink colored vinyl chloride polymer coated fabric was prepared as follows: a knit cotton fabric having 31 wales and 33 courses, as it left the knitting machine, was calender coated in the well known manner with 32.0 ounces per yard 50" wide with a coating composition having the following formulation

| Base coating: | Parts by weight |
|---|---|
| "Vinylite" VYNW (95 parts of vinyl chloride and 5 parts of vinyl acetate) | 44.25 |
| Calcium carbonate | 22.12 |
| Stabilizer (coprecipitated barium and cadmium salts of fatty acids) | 1.33 |
| Polypropylene adipate | 5.75 |
| Epoxidized soya oil | 2.66 |
| Di-(2-ethyl hexyl) phthalate | 21.46 |
| Colored pigment | 2.43 |
| | 100.00 |

The base coating on the fabric was surface coated with the following composition by means of doctor roller.

| Colored metallic surface coating: | Parts by weight |
|---|---|
| 14% solution of Geon 101 (polyvinyl chloride) in methyl ethyl ketone | 50.10 |
| 25% solution of polymethyl methacrylate in methyl ethyl ketone | 18.79 |
| Methyl ethyl ketone | 23.87 |
| Aluminum powder (Crescent Ex. Brilliant #7) | 3.13 |
| Pigment dispersion (percent)— | |
|   "Vinylite" VYHH 85 parts vinyl chloride and 15 parts vinyl acetate    80.0 | |
|   Alumina hydrate lake of tri to tetra bromopyranthrone    15.0 | 4.11 |
|   Di-(2-ethyl hexyl) phthalate    5.0 | |
| | 100.00 |

Sufficient of the above composition was applied to the base coating to deposit about 1.0 ounce per yard 50" wide of the non-volatile components. The solvent was evaporated from the surface coat by passing the material through a heat zone. The base coating was lighter in shade than the colored metallic surface coating, which contributes to a two tone color effect and color depth.

The product was of pink color having color depth and brilliant metallic sheen.

To further enhance the appearance of the finished product it may be embossed with various designs by passing the dry coated fabric between pressure rolls, one of which is steel and having a design engraved on its surface. The design of United States Design Patent D. 175,817 is particularly useful for the embossing operation.

The following table illustrates other examples of different colored finishes applied over a base material similar to that described above in Example I. In the case of Examples II to IX the pigments in the base coat were selected to give approximately the same color as the metallic colored surface coat but of a substantially lighter shade.

TABLE I
Percent by weight

| Composition of metallic surface coat | Ex. II | Ex. III | Ex. IV | Ex. V | Ex. VI | Ex. VII | Ex. VIII | Ex. IX |
|---|---|---|---|---|---|---|---|---|
| Geon 101 (polyvinyl chloride) | 9.1 | 7.7 | 8.8 | 7.6 | 7.4 | 7.4 | 7.4 | 7.4 |
| Polymethyl methacrylate | | | | | | | | |
| Di (2 ethyl hexyl) phthalate | | | 3.0 | | | | | |
| Aluminum powder [1] | 5.0 | 5.0 | | 4.6 | 3.8 | 3.8 | 3.8 | 3.8 |
| Methyl ethyl ketone | 1.0 | 1.0 | 1.2 | 2.3 | 4.4 | 4.4 | 4.4 | 4.4 |
| Pigment dispersion: [2] | 82.7 | 84.6 | 85.4 | 82.5 | 82.8 | 82.8 | 82.8 | 82.8 |
| Alumina hydrate lake of flavanthrone | 1.3 | | 1.1 | .9 | | | | |
| Alumina hydrate lake of dibromoanthanthrone | .9 | | .5 | | | | | |
| Alumina hydrate lake of polychloroanthraquinone 2,1 (N) benzacridone | | 1.0 | | | | | | |
| Alumina hydrate lake of trito tetrabromopyranthrone | | | | 1.4 | | | | |
| Alumina hydrate lake of a perylene | | | | | 1.6 | | | |
| Alumina hydrate lake of dibromopyranthrone | | | | | | 1.6 | | |
| Alumina hydrate lake of an anthrimide | | | | | | | 1.6 | |
| Alumina hydrate lake of dimethoxy dibenzene anthanthrone | | | | | | | | 1.6 |
| Carbon black | | | | | | | | |
| Titanium dioxide | | .7 | | .7 | | | | |
| | 100.0 | 100.0 | 100.0 | 100.0 | 100.0 | 100.0 | 100.0 | 100.0 |

[1] The same aluminum powder was used in Ex. I to Ex. IX inclusive and it had the following specifications: Particle size, 90% passing 325 mesh; water coverage, 10,000 to 11,000 sq. cm. per gram; leafing value, 85.5%; specific gravity, 2.54.
[2] The formulation of the pigment dispersion in Ex. II to Ex. IX, inclusive, is as follows:

| Pigment dispersion formulations | Pigment | "Vinylite" VYHH (copolymer of 85 parts vinyl chloride and 15 parts vinyl acetate) | Di(2 ethyl hexyl) phthalate |
|---|---|---|---|
| Alumina hydrate lake of flavanthrone | 30.0 | 65.0 | 5.0 |
| Alumina hydrate lake of dibromoanthanthrone | 15.0 | 80.0 | 5.0 |
| Alumina hydrate lake of polychloroanthraquinone 2,1(N) benzacridone | 15.0 | 80.0 | 5.0 |
| Alumina hydrate lake of tri-to-tetrabromo pyranthrone | 15.0 | 80.0 | 5.0 |
| Alumina hydrate lake of a perylene | 15.0 | 80.0 | 5.0 |
| Alumina hydrate lake of dibromopyranthrone | 15.0 | 80.0 | 5.0 |
| Alumina hydrate lake of an anthrimide | 15.0 | 80.0 | 5.0 |
| Alumina hydrate lake of dimethoxy dibenzene anthanthrone | 15.0 | 80.0 | 5.0 |
| Carbon black | 20.0 | 75.0 | 5.0 |
| Titanium dioxide (R510) | 55.0 | | 45.0 |

The above pigment dispersions were made by grinding the pigment, "Vinylite" VYHH and plasticizer together on conventional pigment grinding equipment adapted for maximum dispersion of pigment. The greater the dispersion of the critical color pigments the greater the brilliance, depth of color and metallic sheen in the final product.

In the preferred examples the base color is approximately the same color as the colored metallic surface coat but of a substantially lighter shade.

*Example X*

A cotton sheeting running 3.6 yards per pound per 40″ width was dyed a yellow color and then base coated by means of a doctor knife with a plurality of coats of the following composition:

```
                                                  Parts by weight
23.0% solution of nitrocellulose in equal parts of
  ethyl acetate and ethyl alcohol_____ 62.49
Castor oil _____ 22.72
                                        Percent
Titanium dioxide (R510)_____   51.97 ⎤
Yellow lead chromate_____   37.80 ⎥
Orange lead chromate_____    7.87 ⎬ 14.79
Carbon black _____     2.36 ⎦
                                                 _____
                                                 100.00
```

After each coat the material was passed through a heat zone to expel the volatile solvent. Sufficient coats were applied to deposit about 3.3 ounces of dry coating per square yard.

The coated fabric was surface coated with the following composition by means of a doctor knife.

```
                                                  Parts by weight
10.9% solution of nitrocellulose in equal parts of
  ethyl acetate and ethyl alcohol_____ 64.0
Aluminum powder (Alcoa #408)_____  3.5
Pigment dispersions (percent):
  Alumina hydrate lake of dibromoan-
    thanthrone _____ 30.0 ⎤
  Nitrocellulose _____ 55.0 ⎬ 6.5
  Dibutyl phathalate _____ 15.0 ⎦
  Alumina hydrate lake of dibromoan-
    thanthrone _____ 20.0 ⎤
  Nitrocellulose _____ 60.0 ⎬ 4.0
  Dibutyl phathalate _____ 20.0 ⎦
Ethyl acetate _____ 13.5
Ethyl alcohol _____ 13.5
                                                 _____
                                                 100.0
```

The above composition was applied to the dry base coated fabric by means of a doctor knife in sufficient amount to deposit about .3 to .5 ounce of non-volatile components per square yard. The coated fabric was dried by passing through a heat zone.

The appearance of the coated fabric was enhanced by embossing in a leather-like design. The coated fabric was particularly useful as a non-tarnishing brilliant, gold metallic finish bookbinding material. The product was also useful for ladies' pocketbooks, case coverings, and novelties.

The preferred particle size of the aluminum pigment, to achieve the objects of this invention is within the range of 100 to 400 mesh size. It is preferred to use the leafing varieties of aluminum pigment although useful products can be made with the non-leafing varieties with some sacrifice in brilliance.

Aluminum pigments having the following specifications have been found to be useful in practicing this invention:

| Trade designation | Mesh size | Water coverage | Approx. leafing value | Specific gravity | Non-volatile content, percent |
|---|---|---|---|---|---|
| Metals disintegrating M.D. 7100 | 98% passing 400 mesh | 25,000 sq. cm./gm | 60% | 2.50 | 100 |
| ALUMINUM CO. OF AMERICA | | | | | |
| (1) Std. lining powder No. 408 | 99% thru 325 mesh | 17,000–19,000 sq. cm./gm | 70% | 2.50 | 100 |
| (2) Std. paste No. 205 | 99.5% thru 325 mesh | 16,000 sq. cm./gm | 65% | 1.47 | 65.5–66 |
| (3) Std. varnish powder No. 322 | 0.5% retained on 100 mesh 92% thru 325 mesh | 10,000 sq. cm./gm | 80% | 2.55 | 100 |
| (4) Lining Litho powder No. 552 | 98% thru 325 mesh | Cannot be determined | Non-leafing | 2.66 | 100 |

The aluminum powder may be incorporated in the colored surface coat as a dry powder or as a paste of aluminum powder and volatile organic liquid which wets the aluminum particles.

The weight ratio of aluminum powder to the critical colored pigments may vary over a wide range depending upon the final color, metallic sheen, and brilliance desired. The weight ratios of the critical colored pigments to aluminum powder in Examples I to X vary between 1:7 and 1:1.3. The useful weight ratios of the critical colored pigments to aluminum powder in carrying out this invention vary between 1/.5 and 1/10. As noted in Examples III and V other pigments may be blended with the critical colored pigments in the colored surface layer. The critical colored pigments must be present in amount greater than that of the non-critical pigment.

The film forming component in the base coat and the colored metallic surface coat is not critical. For obvious reasons, the film former in the base coat should be the same as or adherent to the film former in the colored metallic surface coat. The plastic sheet material may be an unsupported film of the base composition. There is to be no particular limit to be placed on the invention with respect to the film former in the base coat and surface coats. In addition to the polyvinyl chloride and copolymers of vinyl chloride and vinyl acetate used in the specific examples, it is to be understood that other synthetic resins can be used in place thereof, such as e.g., polyvinyl acetals and other copolymers, such as the copolymer of vinyl chloride and vinylidene chloride. The invention is not limited to flexible coatings applied to flexible substrates. Substantially non-flexible coatings used on rigid substrates may be made in accordance with this invention. Film formers for the substantially non-flexible coatings include alkyd resins, urea-formaldehyde, polyalkyl acrylates, such as, e.g., 1–8 carbon atom polyalkyl esters of acrylic or methacrylic acid.

The products of this invention may be embossed in a variety of patterns. The most striking and unusual color effects are obtained with patterns having a plurality of series of closely spaced parallel lines (about 80–120 lines to the inch) running in different directions. Such line embossings produce a polychromatic effect in which different colors are visible when the line embossed surfaces are viewed from different angles.

In the specific examples, the colored metallic surface coat is applied before the sheet material is embossed. Unusual color effects are also obtained by embossing the base coated fabric and subsequently applying the metallic surface coat over the embossed surface.

The advantages of the products of this invention over prior art materials are many. The more important advantages are the high brilliance and metallic sheen. It is possible to match the color of such metals as gold and copper with the surface coats of this invention which do not become discolored upon exposure to the atmosphere.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

The embodiments of the invention in which an exclusive property or privilege is claimed are defined as follows:

1. A plastic sheet material having a base layer comprising an organic film forming material and a colored pigment and a surface layer, said surface layer comprising an organic film forming material, finely divided aluminum at least 90% of which will pass through a 325 mesh screen and a colored pigment, said second mentioned colored pigment being selected from the class consisting of alumina hydrate lake of flavanthrone, alumina hydrate lake of dibromoanthanthrone, alumina hydrate lake of polychloro-anthraquinone 2,1(N)-benzacridone, alumina hydrate lake of tri- to tetra-bromo pyranthrone, alumina hydrate lake of a perylene, alumina hydrate lake of dibromopyranthrone, alumina hydrate lake of an anthrimide, alumina hydrate lake of dimethoxy dibenzene anthranthrone, and mixtures thereof, said base layer and said surface layer having substantially the same color, and said base layer being of lighter shade than the surface layer.

2. The product of claim 1 in which the base layer and surface layer comprise a vinyl chloride polymer.

3. The product of claim 1 in which the plastic sheet material is a vinyl chloride polymer coated fabric.

4. The product of claim 1 in which the weight ratio of the critical colored pigment to aluminum powder is within the range of 1/.5 and 1/10.

References Cited in the file of this patent

UNITED STATES PATENTS

| | | |
|---|---|---|
| 2,453,052 | Van Etten | Nov. 2, 1948 |
| 2,625,689 | Whewell | Jan. 20, 1953 |
| 2,683,668 | Godshalk | July 13, 1954 |
| 2,769,722 | Converse | Nov. 6, 1956 |
| 2,878,141 | Conniff | Mar. 17, 1959 |
| 2,941,894 | McAdow | June 21, 1960 |

OTHER REFERENCES

"The Chemistry of Synthetic Dyes and Pigments," edited by H. A. Lubs; Reinhold Publishing Corp.; TP913L8 c. 3; 1955 (pp. 655–659 relied upon).